(12) United States Patent
Adachi et al.

(10) Patent No.: US 9,342,543 B2
(45) Date of Patent: May 17, 2016

(54) THREE-DIMENSIONAL TIME SERIES DATA

(71) Applicant: INTERNATIONAL BUSINESS MACHINES CORPORATION, Armonk, NY (US)

(72) Inventors: Kumi Adachi, Zama (JP); Eisuke Kanzaki, Fujisawa (JP); Koichi Takahashi, Tokyo (JP); Takashi Takahashi, Tokyo (JP); Hideo Takeda, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 14/352,224

(22) PCT Filed: Sep. 25, 2012

(86) PCT No.: PCT/JP2012/074594
§ 371 (c)(1),
(2) Date: Apr. 16, 2014

(87) PCT Pub. No.: WO2013/088812
PCT Pub. Date: Jun. 20, 2013

(65) Prior Publication Data
US 2014/0297637 A1  Oct. 2, 2014

(30) Foreign Application Priority Data

Dec. 12, 2011  (JP) .................................. 2011-271577

(51) Int. Cl.
*G06F 17/30* (2006.01)
(52) U.S. Cl.
CPC .... *G06F 17/30312* (2013.01); *G06F 17/30424* (2013.01); *G06F 17/30551* (2013.01)
(58) Field of Classification Search
USPC ................................................ 707/728, 736
See application file for complete search history.

(56) References Cited

U.S. PATENT DOCUMENTS

| 5,694,616 A * | 12/1997 | Johnson | G06Q 10/107 709/207 |
| 7,996,374 B1 * | 8/2011 | Jones | G06Q 10/10 707/694 |

(Continued)

FOREIGN PATENT DOCUMENTS

| JP | 11-031154 | 2/1999 |
| JP | H1188426 A | 3/1999 |

(Continued)

OTHER PUBLICATIONS

International Searching Authority—International Search Report for International Application No. PCT/JP2012/074594, mailed Oct. 30, 2012.

(Continued)

*Primary Examiner* — Kim Nguyen
(74) *Attorney, Agent, or Firm* — Law Office of Jim Boice

(57) ABSTRACT

A system, device, computer program product, and/or method generates display data that allows a user to ascertain relationship between related electronic information from among sent and received electronic information. The three-dimensional time series data processing system selects one electronic information, extracts electronic information relating to the selected electronic information from the electronic information database, calculates relevance between the sender of the selected electronic information and the sender of the extracted electronic information, and generates three-dimensional time series data for three-dimensionally rendering a relationship between the selected electronic information and the extracted electronic information as positional information of the respective extracted electronic information in a virtual three-dimensional space, where the sender, the send time and the relevance are axes. In addition, the three-dimensional time series data processing system renders three-dimensional time series data for relevance of electronic information in cylindrical coordinates and displays the data while modifying a viewing angle.

15 Claims, 11 Drawing Sheets

(56) References Cited

U.S. PATENT DOCUMENTS

| | | | | |
|---|---|---|---|---|
| 8,089,503 B2* | 1/2012 | Bruce | ............... | H04L 12/587 348/14.01 |
| 8,392,520 B2* | 3/2013 | Harada | ............... | H04L 12/587 709/206 |
| 8,543,927 B1* | 9/2013 | McKinley | ............... | H04M 1/72552 715/753 |
| 8,751,385 B1* | 6/2014 | Chapman | ............... | G06Q 10/107 705/1.1 |
| 8,793,319 B2* | 7/2014 | Turski | ............... | G06Q 10/107 705/319 |
| 8,943,418 B2* | 1/2015 | Zhou | ............... | G06Q 10/107 707/999.005 |
| 9,178,916 B2* | 11/2015 | Katis | ............... | G06Q 10/107 |
| 2007/0061423 A1 | 3/2007 | Accapadi et al. | | |
| 2008/0016451 A1 | 1/2008 | Funabashi et al. | | |
| 2008/0052633 A1 | 2/2008 | Kubo et al. | | |
| 2010/0058213 A1 | 3/2010 | Higuchi et al. | | |
| 2012/0083260 A1 | 4/2012 | Arriola et al. | | |

FOREIGN PATENT DOCUMENTS

| | | |
|---|---|---|
| JP | H11328062 A | 11/1999 |
| JP | 2002091876 A | 3/2002 |
| JP | 2007080273 A | 3/2007 |
| JP | 2008011033 A | 1/2008 |
| JP | 2008052521 A | 3/2008 |
| JP | 2008134833 A | 6/2008 |
| JP | 2010055430 A | 3/2010 |
| JP | 2010146465 A | 7/2010 |
| JP | 2011022811 A | 2/2011 |

OTHER PUBLICATIONS

International Searching Authority—Written Opinion for International Application No. PCT/JP2012/074594, mailed Oct. 30, 2012 (Japanese language).

International Bureau—Translation of International Preliminary Report on Patentability for International Application No. PCT/JP2012/074594, mailed Jun. 26, 2014.

* cited by examiner

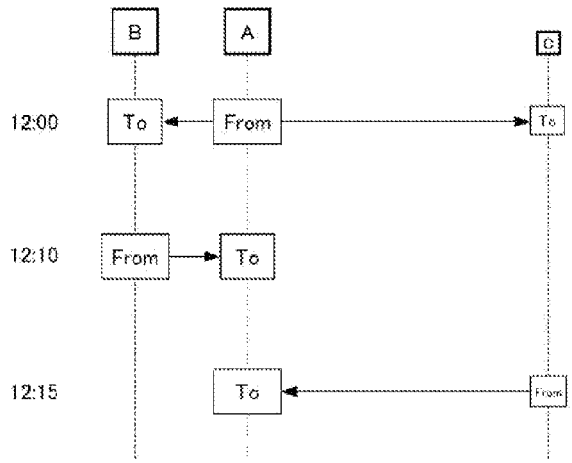

FIG. 1a

| ELECTRONIC INFORMATION | ATTRIBUTE INFORMATION | CONTENT INFORMATION |
|---|---|---|
| ELECTRONIC INFORMATION J1 | DESTINATION INFORMATION: B, C<br>SENDER INFORMATION: A<br>SEND TIME INFORMATION: 12:00<br>IDENTIFICATION INFORMATION: A1<br>RELATED INFORMATION: (NONE) | ... I WILL BE IN CONTACT, THANK YOU VERY MUCH. |
| ELECTRONIC INFORMATION J2 | DESTINATION INFORMATION: A<br>SENDER INFORMATION: B<br>SEND TIME INFORMATION: 12:10<br>IDENTIFICATION INFORMATION: B1<br>RELATED INFORMATION: A1 | THANK YOU FOR CONTACTING ME. |
| ELECTRONIC INFORMATION J3 | DESTINATION INFORMATION: A<br>SENDER INFORMATION: C<br>SEND TIME INFORMATION: 12:15<br>IDENTIFICATION INFORMATION: C1<br>RELATED INFORMATION: A1 | BY THE WAY, WHATEVER HAPPENED TO XXX? |
| ... | ... | ... |

FIG. 1b

| Email | Header Part | Message Part |
|---|---|---|
| Email M1 | To: B, C, D<br>From: A<br>CC:<br>Time: 12:00<br>Message-ID: A1<br>In-Reply-To: (none) | ... I Will Be In Contact, Thank You Very Much. |
| Email M2 | To: A<br>From: B<br>CC: C, D<br>Time: 12:10<br>Message-ID: B1<br>In-Reply-To: A1 | Thank you for contacting me. |
| Email M3 | To: B<br>From: A<br>CC: C, D<br>Time: 12:15<br>Message-ID: A2<br>In-Reply-To: B1 | By the way, whatever happened to XXX? |
| Email M4 | To: B<br>From: C<br>CC: A, D<br>Time: 12:16<br>Message-ID: C1<br>In-Reply-To: B1 | I am also concerned about XXX. |
| Email M5 | To: C<br>From: B<br>CC: A<br>Time: 12:20<br>Message-ID: B2<br>In-Reply-To: C1 | XXX has been taken care of. |
| ... | ... | ... |

FIG. 4

| | A | B | C | D | ... | EXPLANATION |
|---|---|---|---|---|---|---|
| | TO:B,FR:A<br>12:00<br>ID:A1 | 0.2 | | | | |
| | TO:C,FR:A<br>12:00<br>ID:A1 | | 0.2 | | | |
| | TO:D,FR:A<br>12:00<br>ID:A1 | | | 0.2 | | |
| | TO:A,FR:B<br>12:10<br>ID:B1 Re:A1 | 0.5 | | | | REPLY |
| | TO:B,FR:A<br>12:15<br>ID:A2 Re:B1 | 0.6 | | | | REPLY |
| | Cc:C,FR:A<br>12:15<br>ID:A2 | | 0.1 | | | |
| | Cc:D,FR:A<br>12:15<br>ID:A2 | | | 0.1 | | |
| | Cc:A,FR:C<br>12:16<br>ID:C1 | | 0.1 | | | |
| | Cc:A,FR:B<br>12:20<br>ID:B2 | 0.1 | | | | |
| | ... | ... | ... | ... | ... | |
| | RELEVANCE | 1.4 | 0.4 | 0.3 | ... | |

FIG. 5

THREE-DIMENSIONAL TIME SERIES DATA

BACKGROUND

The present invention relates to a system, device, and method for processing data in a three-dimensional time series.

Conventionally, when exchanging information (for example, email) by communication (for example, internet communication), a communication management tool that manages the exchanged information organizes, manages, and enables browsing of sent and received information.

For example, certain email management tools that manage email, when browsing one email, will display all emails related to the browsed email by chronologically indenting. In addition, email management tools can save a document link or follow a link to the immediate preceding mail (the mail that is the source of the reply).

Further, for example, different email management tools, when browsing one email, will display all mails related to the browsed email in a cascade. This process is called a "thread view" and always displays the newest mail in front.

According to this type of email management tool, although related mail is displayed in a single thread, who sent the email to whom or what the content of the sent email is cannot be determined at a glance. Further, the time relationship of related emails cannot be ascertained at a glance when the threads are different.

For this type of email, known art uses an email management device that can verify email history and attached file history. This email management device displays a correspondence relationship for email in a tree structure based on historical data of accumulated email. Furthermore, this email management device displays attached files in a tree structure when an attached file is attached to an email.

Also, other known art uses a message display system to verify related messages. The message display terminal of this system takes, for example, a series of messages and three-dimensionally displays the messages of each thread by displaying the message in the X axis direction, arranging the messages in chronological order in the Y axis direction, and adopts the type of thread in the Z axis direction.

In addition, other known art includes an information presentation method that verifies update information for a plurality of content information data. This information presentation method displays by arranging an update information display card that is supported for content information data in chronological order of updates for content information data.

SUMMARY

In one embodiment of the present invention, a three-dimensional time series data processing system comprises: an electronic information hardware storage unit configured to store a plurality of electronic information that are sent and received via a given communication medium, each of the plurality of electronic information including content information and attribute information having identification information, sender information that indicates a sender, destination information that indicates a destination, send time information that indicates a time at which corresponding electronic information is sent, and relation information that includes identification information of other related electronic information; a selection hardware unit configured to select one electronic information from among the plurality of electronic information stored in the electronic information storage unit; an extraction hardware unit configured to extract electronic information related to selected electronic information selected by the selection unit, from among the plurality of electronic information stored in the electronic information storage unit; a relevance calculation hardware unit configured to calculate a relevance between a selected sender indicated by the sender information of the selected electronic information and related senders indicated by the sender information from the plurality of electronic information extracted by the extraction unit; and a three-dimensional data generation hardware unit configured to generate three-dimensional time-series data for three-dimensionally rendering a relationship between the selected electronic information and extracted electronic information extracted from the extraction unit, wherein the three-dimensional data generation unit generates positional information of each of the plurality of extracted electronic information in a virtual three-dimensional space in which a sender indicated by the sender information, a send time indicated by send time information, and relevance calculated by the relevance calculation unit according to three-dimensional axes.

In one embodiment of the present invention, a method of generating three-dimensional time series data comprises: storing a plurality of electronic information that are sent and received via a given communication medium, each of the plurality of electronic information including content information and attribute information having identification information, sender information that indicates a sender, destination information that indicates a destination, send time information that indicates a time at which corresponding electronic information is sent, and relation information that includes identification information of other related electronic information; selecting one electronic information from among the plurality of electronic information stored in the electronic information storage unit; extracting electronic information related to selected electronic information selected by the selection unit, from among the plurality of electronic information stored in the electronic information storage unit; calculating a relevance between a selected sender indicated by the sender information of the selected electronic information and related senders indicated by the sender information from the plurality of electronic information extracted by the extraction unit; and generating three-dimensional time-series data for three-dimensionally rendering a relationship between the selected electronic information and extracted electronic information extracted from the extraction unit, wherein the three-dimensional data generation unit generates positional information of each of the plurality of extracted electronic information in a virtual three-dimensional space in which a sender indicated by the sender information, a send time indicated by send time information, and relevance calculated by the relevance calculation unit according to three-dimensional axes.

In one embodiment of the present invention, a computer program product for generating three-dimensional time series data comprises a computer readable storage medium having program code embodied therewith, the program code readable and executable by a processor to perform a method comprising: storing a plurality of electronic information that are sent and received via a given communication medium, each of the plurality of electronic information including content information and attribute information having identification information, sender information that indicates a sender, destination information that indicates a destination, send time information that indicates a time at which corresponding electronic information is sent, and relation information that includes identification information of other related electronic information; selecting one electronic information from among the plurality of electronic information stored in the electronic information storage unit; extracting electronic information related to selected electronic information selected by the selection unit, from among the plurality of electronic information stored in the electronic information storage unit; calculating a relevance between a selected sender indicated by the sender information of the selected electronic information and related senders indicated by the sender information from the plurality of electronic information extracted by the extraction unit; and generating three-dimensional time-series data for three-dimensionally rendering a relationship between the selected electronic information and extracted electronic information extracted from the extraction unit, wherein the three-dimensional data generation unit generates positional information of each of the plurality of extracted electronic information in a virtual three-dimensional space in which a sender indicated by the sender information, a send time indicated by send time information, and relevance calculated by the relevance calculation unit according to three-dimensional axes.

BRIEF DESCRIPTION OF THE SEVERAL VIEWS OF THE DRAWINGS

FIGS. 1a-1b present a diagram illustrating an outline of the present invention.

FIG. 4 is a diagram illustrating an example of an email DB as an electronic information DB according to an embodiment of the present invention.

FIG. 5 is a diagram illustrating an example of a relevance DB of a three-dimensional time series data processing device according to an embodiment of the present invention.

DETAILED DESCRIPTION

Embodiments of the present invention will be described hereinafter with reference to drawings, taking email as an example of electronic information. The example of electronic information is not limited to email and may also be BBS data, distributed content with questionnaires, or the like.

Even when utilizing the technologies disclosed above, the relevance of information becomes complexly entangled when forwarding and replying are repeated for sent and received electronic information (for example, email) making it difficult to ascertain the flow of the sent and received information.

Therefore, technology is presented herein for sent and received electronic information that can search related electronic information within an inbox, retrieve the send and receive time for the electronic information, the send and receive relationship of the electronic information, and the content of the electronic information, easily browse a series of electronic information, and ascertain content while searching. In one or more embodiments, the present invention addresses these issues.

FIGS. 1a-1b present a diagram illustrating an outline of the present invention. FIG. 1a illustrates electronic information virtually displayed based on a three-dimensional time series data generated by a three-dimensional time series data processing system 1. FIG. 1b illustrates electronic information storage unit that stores electronic information that includes attribute information and content information.

FIG. 1a illustrates that relevance of sent and received electronic information can be displayed based on three-dimensional time series data generated by the three-dimensional time series data processing system 1 so as to allow a user to easily ascertain the relevance. The three-dimensional time series data processing system 1 extracts electronic information J2 and electronic information J3 that relate to selected electronic information from an electronic information storage unit, calculates the relevance between sender A of the selected electronic information J1 and senders B and C of the extracted electronic information J2 and the electronic information J3, and generates three-dimensional time series data which is positional information of the electronic information J1, the electronic information J2, and the electronic information J3 in a virtual three-dimensional space where the sender, the send time, and the relevance are axes. For example, the relevance between sender A and sender B is higher than the relevance between sender A and sender C because the reply from sender B to sender A is earlier than the reply from sender C to sender A. Based on this three-dimensional time series data, for example, electronic information of sender C is displayed in a positional relationship separated further away than the positional relationship of sender A and sender B, and with a smaller size.

Figure 2:
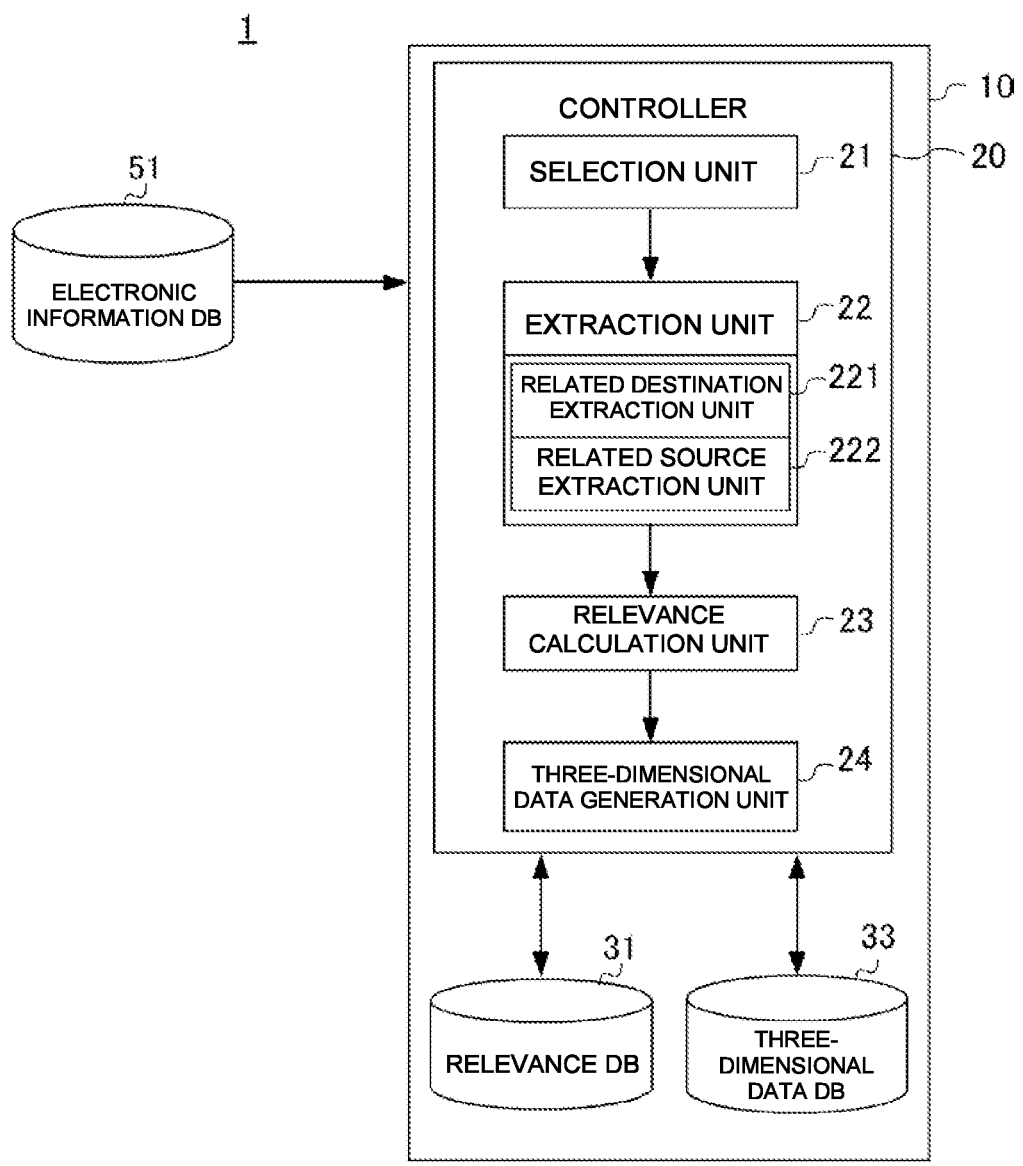
FIG. 2 is a functional block diagram illustrating a functional configuration of a three-dimensional time series data processing system according to an embodiment of the present invention.

FIG. 2 is a functional block diagram illustrating a functional configuration of a three-dimensional time series data processing system according to an embodiment of the present invention.

The three-dimensional time series data processing system 1 is provided with an electronic information DB (database) 51 and a three-dimensional time series data processing device 10 that is provided with a selection unit 21, an extraction unit 22, a relevance calculation unit 23, and a three-dimensional data generation unit 24. A detailed description of each component will be given hereinafter.

The electronic information DB 51 stores a plurality of electronic information that has been sent and received by a given communication medium (for example, Internet or the like). The electronic information includes content information and attribute information, and the attribute information includes identification information of the electronic information, sender information that indicates a sender, destination information that indicates a destination, send time information that indicates the time at which the electronic information is sent, and related information that includes identification information of other related electronic information.

In an example where email is used as the electronic information, an email includes a header part as attribute information and a message part as content information. The header part includes an email ID, a sender, a destination, send time, and an email ID of a reply source in the event of a reply.

The electronic information DB 51 may store electronic information for each sender indicated by, for example, a sender information such as an outbox and an inbox for the sender.

The selection unit 21 selects one electronic information from among a plurality of electronic information stored in the electronic information DB 51. Specifically, the selection unit 21 selects a designated electronic information in which one electronic information is designated from an input device (for example, a mouse, keyboard, or the like). In addition, the selection unit 21 may also be configured to select automatically (to select an email that includes a keyword within the message) based on designated information (for example, a keyword).

The extraction unit 22 extracts electronic information related to selected electronic information selected by the selection unit 21, from a plurality of electronic information stored in the electronic information DB 51.

Specifically, in email, the extraction unit 22 extracts related email based on reply information of email. The reply information of email stores an email ID of a reply source.

The extraction unit 22 is further provided with a related source extraction unit 222 and a related destination extraction unit 221. The related source extraction unit 222 extracts electronic information identified by identification information included in related information of the selected electronic information, and further, extracts electronic information identified by identification information included in related information of the extracted electronic information. The related destination extraction unit 221 extracts electronic information that includes identification information of the selected electronic information in related information, and further, extracts electronic information that includes identification information of the extracted electronic information in related information. The extraction unit 22, for example, traces the reply information of the email and extracts a reply mail of another reply mail by the related destination extraction unit 221 and extracts a reply source mail of another reply source mail by the related source extraction unit 222. The extraction is performed until no items subject to extraction remain, and the extraction may be terminated when, for example, a specified number of attempts to trace related information has been reached, or when a specified time for the extraction has elapsed.

The relevance calculation unit 23 calculates the relevance between a selected sender indicated by the sender information of the selected electronic information and the related sender indicated by the sender information of the plurality of electronic information extracted by the extraction unit 22. Specifically, the relevance calculation unit 23 converts, for example, the number of replies and the reply time (time difference between send time of a sent mail and send time of a reply mail) to scores, calculates a score for each sender and stores it in the relevance DB 31. Note that the send time of a reply mail may also be the receive time. In addition, the relevance calculation unit 23 calculates the ratio of the total sum of the scores to the score for each sender to obtain the relevance. The relevance calculation unit 23 may derive ranking according to the calculated score for each sender and calculate the relevance according to the derived ranking.

The three-dimensional data generation unit 24 generates three-dimensional time series data for three-dimensionally rendering a relationship between the selected electronic information and extracted electronic information extracted by the extraction unit 22. Specifically, the three-dimensional data generation unit 24 associates electronic information with three-dimensional data (sender, relevance, send time) to obtain positional information in a virtual three-dimensional space and stores the positional information in a three-dimensional data DB 33. In this manner, the three-dimensional data generation unit 24 can generate three-dimensional time series data such that the electronic information can be displayed in a three-dimensional space by a display process.

Figure 3:
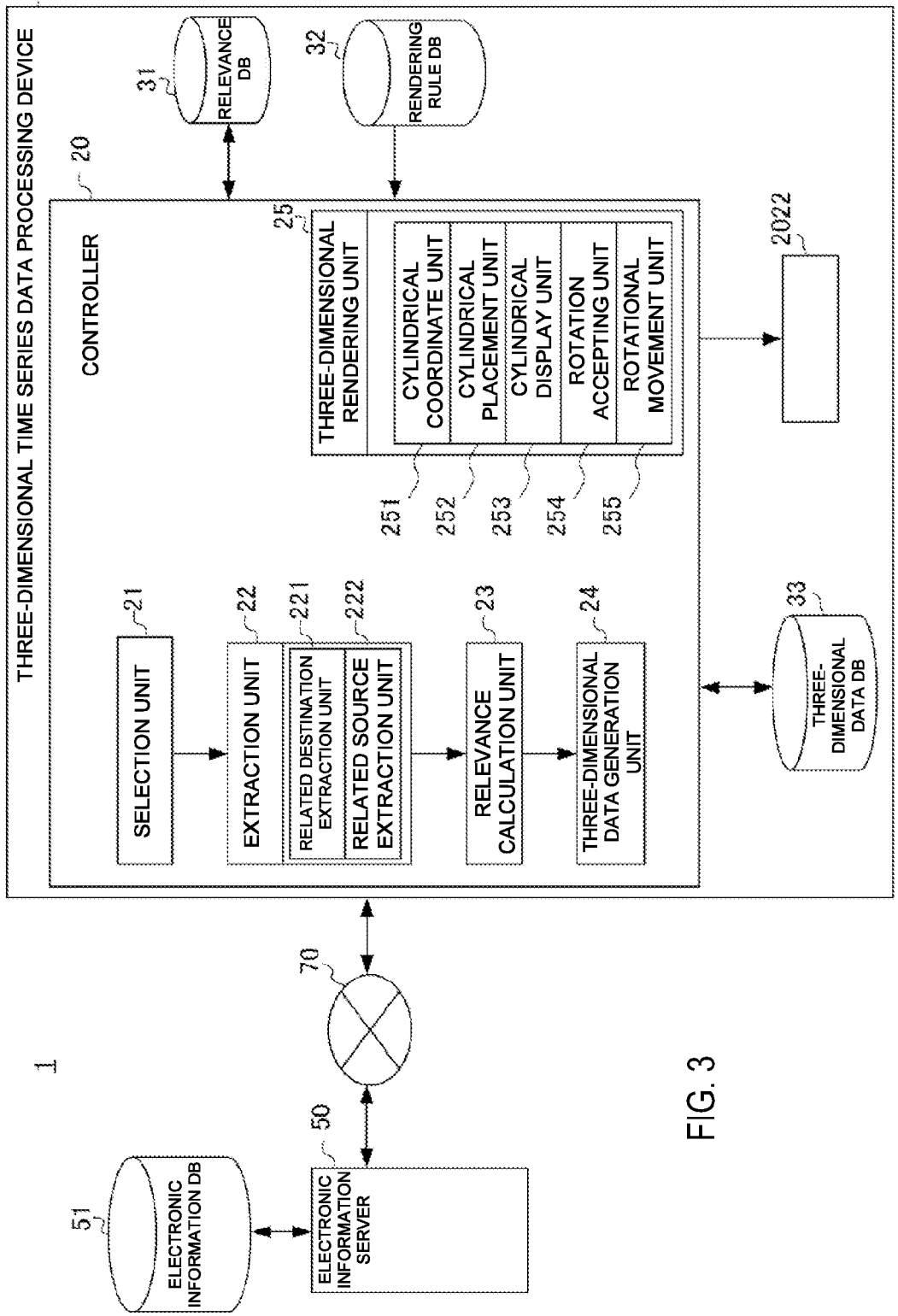
FIG. 3 is a functional block diagram illustrating a functional configuration of a three-dimensional time series data processing device according to an embodiment of the present invention.

FIG. 3 is a functional block diagram illustrating a functional configuration of the three-dimensional time series data processing device 10 according to an embodiment of the present invention. The three-dimensional time series data processing device 10 is provided with the selection unit 21, the extraction unit 22, the relevance calculation unit 23, and the three-dimensional data generation unit 24 as described above, and is further provided with a three-dimensional rendering unit 25, and a rendering rule DB 32. A detailed description of the three-dimensional rendering unit 25 follows.

The three-dimensional rendering unit 25 renders three-dimensional time series data generated by the three-dimensional data generation unit 24. The three-dimensional rendering unit 25 is provided with a cylindrical coordinate unit 251, a cylindrical placement unit 252, a cylindrical display unit 253, a rotation accepting unit 254, and a rotational movement unit 255. A detailed description of each component will be given hereinafter.

The cylindrical coordinate unit 251 is configured such that the z axis of the cylindrical coordinates $(r, \theta, z)$ having a given radius r is the send time indicated by the send time information, and $\theta$ is the relevance.

The cylindrical placement unit 252 places, along the surface of a cylinder formed by the cylindrical coordinate unit, content information of electronic information having the same sender information as the sender information of the selected electronic information from among the extracted electronic information in the center of the surface of the cylinder with $\theta$ as 0 degrees in order of the send time of the z axis, and places content information of electronic information having different sender information from the sender information of the selected electronic information from among the extracted electronic information on the surface of the cylinder by changing $\theta$ for each sender information according to the level of the relevance in order of the send time of the z axis.

The cylindrical display unit 253 displays the content information placed by the cylindrical placement unit 252 by changing the configuration of the display that shows the content information according to the position on the surface of the cylinder at which the content information is places. Specifically, the cylindrical display unit 253, for example, largely and clearly displays content information having high relevance placed on the front of the surface of the cylinder, and displays content information placed on the rear of the surface of the cylinder lighter and smaller as it leaves away from the front.

The rotation accepting unit 254 accepts an instruction that designates the sender information from among the content information for each sender information placed by the cylindrical placement unit 252.

The rotational movement unit 255 makes content information of electronic information having the same sender information as the sender information designated by the instruction accepted by the rotation accepting unit to be in the center of the surface of the cylinder, and moves content information of electronic information having different sender information from the designated sender information along the surface of the cylinder according to content information of the designated sender information placed in the center of the surface of the cylinder.

The rendering rule DB 32 stores rendering rules in which rules for three-dimensionally rendering three-dimensional time series data are prescribed. The three-dimensional rendering unit 25 renders on a display device 2022 based on the rendering rules stored in the rendering rule DB 32. Specifically, in order to render the content information, the rendering rule DB 32 stores the association with elements of the coordinate axis (for example, association of a unit of data with a scale for rendering), order, color and shape of senders, size, color and brightness based on the relevance, and the like.

FIG. 4 is a diagram illustrating an example of an email DB 61 as an electronic information DB 51 according to one embodiment of the present invention. "To" in the header part indicates a destination, "From" indicates a sender, "Cc" indicates a destination where a copy of the email is sent, "Time" indicates send time, "Message ID" indicates an email ID, and "In-Reply-To" indicates reply information as related information in which the email ID of the reply source is stored in the case of a reply. For example, when email M4 (email ID: C1) is selected electronic information, the email M2 of the reply source is extracted by the email ID: B1 stored in the "In-Reply-To" and the email M1 of the reply source is extracted by email ID: A1 stored in the "In-Reply-To" of email M2. Next, the email M5 in which the email ID: C1 of email M4 is stored in the "In-Reply-To" is extracted.

FIG. 5 is a diagram illustrating an example of a relevance DB 31 of a three-dimensional time series data processing device 10 according to an embodiment of the present invention. In the three-dimensional time series data processing device 10, for example, when the email M1 (email ID: A1) in FIG. 4 is the selected electronic information, the emails M2-M5 are extracted from the email DB 61. For example, the relevance shown in FIG. 5 is calculated when 0.2 is for a destination, 0.1 is for a destination by Cc, 0.6 is for replying within 5 min., 0.5 is for replying within 30 min., 0.4 is for replying within 60 min., and 0.3 is for replying outside of 60 min.

Figure 6:
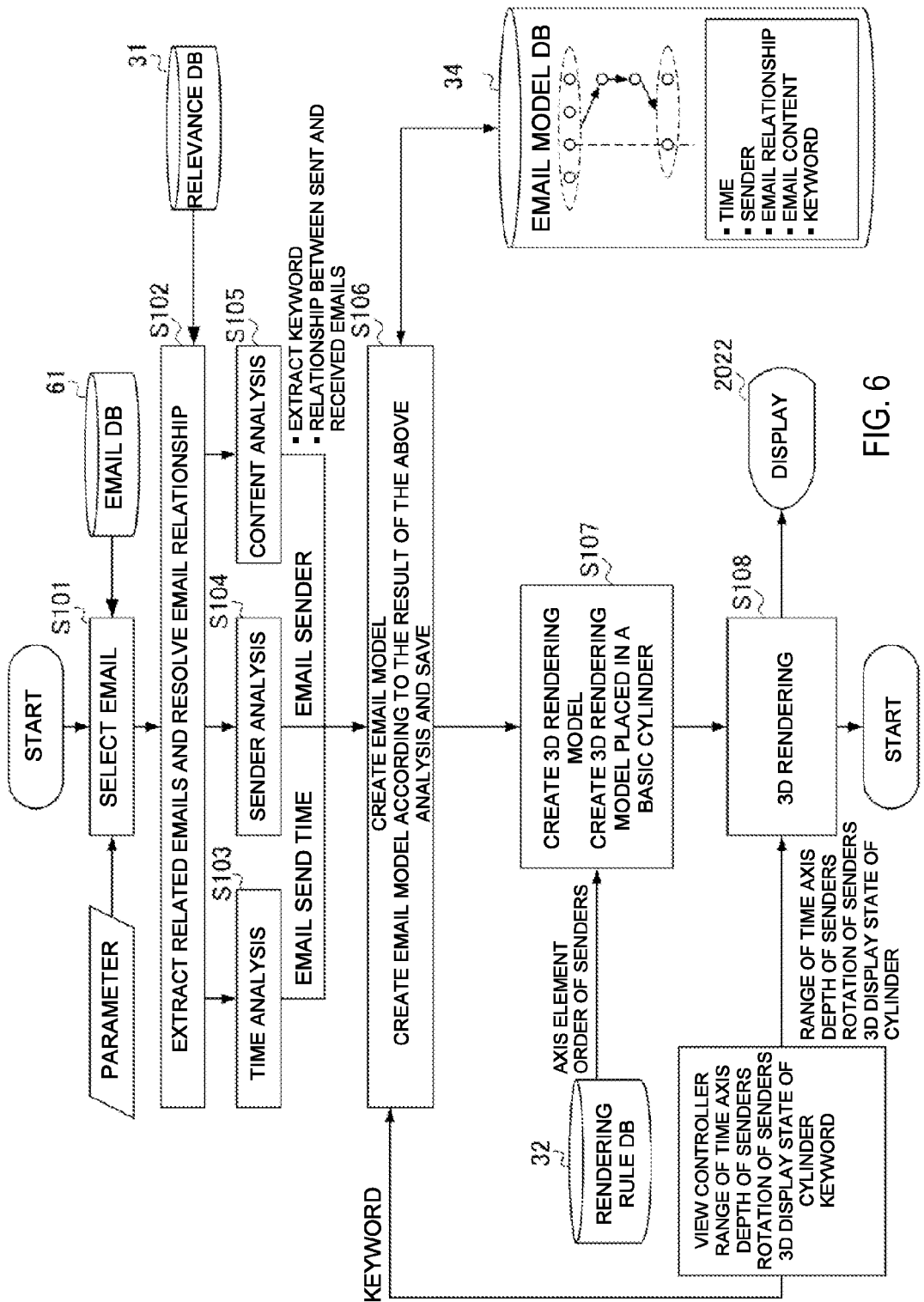
FIG. 6 is a flowchart illustrating a processing operation of a three-dimensional time series data processing device according to an embodiment of the present invention.

FIG. 6 is a flowchart illustrating a processing operation of the three-dimensional time series data processing device 10 according to an embodiment of the present invention. The controller 20 of the three-dimensional time series data processing device 10 executes the following steps.

In step S101, the controller 20 selects an email. Specifically, the controller 20 selects an email specified from a keyboard or mouse.

In step S102, the controller 20 extracts emails related to the email selected in step S101. Specifically, the controller 20, based on the reply information of the email, extracts all of the related emails (a reply email of another reply mail, a reply source mail of another reply source mail, and the like by tracing the reply information).

In step S103, the controller 20 performs time analysis on the email extracted in step S102 and calculates the relevance based on the reply time of the extracted email.

In step S104, the controller 20 performs sender analysis of the emails extracted in step S102 and, after collecting emails for each sender, calculates the relevance based on the relationship between the senders and the receivers of the collected emails.

In step S105, the controller 20 performs content information analysis of the emails extracted in step S102, extracts keywords, analyzes the relationship of sending and receiving of the emails, and calculates the relevance.

In step S106, the controller 20 generates an email model for the emails extracted in step S102 based on the time analysis, sender analysis, and content information analysis, and stores it in an email model DB 34.

Specifically, the controller 20 arranges the emails chronologically for each sender and creates a link tree model in which the emails are linked according to the reply information.

In step S107, the controller 20 creates a three-dimensional time series model. Specifically, the controller 20 associates three-dimensional data (sender, relevance, send time) with each email to assign positional information in a cylindrical coordinate space based on the rendering rules DB 32.

In step S108, the controller 20 performs rendering based on the three-dimensional time series data. Specifically, the controller 20 places the selected email and extracted emails on the surface of a cylinder. The controller 20 displays by changing the configuration of the display (for example, enlarging the display according to the proximity to the center of the surface of the cylinder and lightening the density of the display color on the rear of the cylinder) that indicates the content information according to the position on the surface of the cylinder at which the content information is placed. In addition, the axis of the cylinder is rotated by an instruction from a keyboard, mouse or the like, and content information of a designated sender is displayed in the center of the surface of the cylinder while other content information is moved to be placed along the surface of the cylinder.

Figure 7:
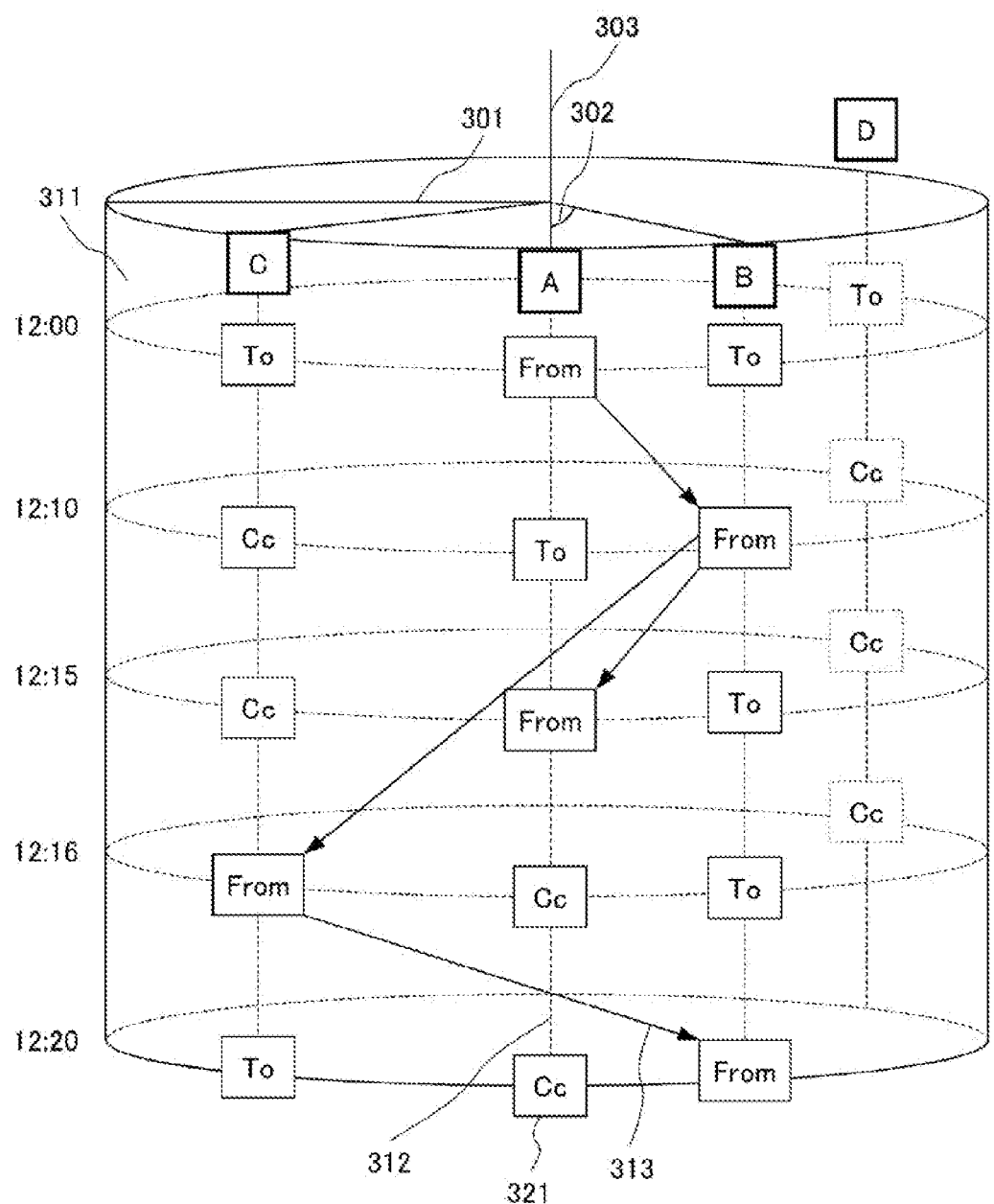
FIG. 7 is a diagram illustrating an example of a placement of content information in cylindrical coordinates of a three-dimensional time series data processing device according to an embodiment of the present invention.

FIG. 7 is a diagram illustrating an example of a placement of content information in cylindrical coordinates of a three-dimensional time series data processing device 10 according to an embodiment of the present invention. FIG. 7 shows that the three-dimensional time series data processing device 10 places, along the surface 311 of the cylinder of the cylindrical coordinates (r, θ, z) having a given radius r 301, content information of an email having the same sender information as sender A of a selected email from among extracted emails in the center 312 of the surface 311 of the cylinder with θ 302 at θ degrees in order of the send time of the Z axis 303. FIG. 7 further shows that the three-dimensional time series data processing device 10 places content information of emails having senders B, C, and D differing from sender A of the selected email from among the extracted emails on the surface 311 of the cylinder in order of the send time by changing θ 302 for each sender B, C, and D according to the level of the relevance.

Furthermore, the three-dimensional time series data processing device 10 changes the display configuration according to the relevance. For example, the three-dimensional time series data processing device 10 clearly displays emails having high relevance placed on the front of the surface 311 of the cylinder in a large size, and displays emails placed around to the back side from both sides of the front of the surface 311 of the cylinder lighter and smaller as the emails leave away from the front. In addition, the three-dimensional time series data processing device 10 displays marks 321 indicating emails by not only a sender (From) but also a receiver (To) at the send time and a receiver (Cc) of a copy, based on the header parts of the emails. In addition, the three-dimensional time series data processing device 10 displays the arrow line 313 that connects the marks 321, which shows that the email at the head of the arrow line 313 is a reply mail of the email at the root of the arrow line 313.

Figure 8:
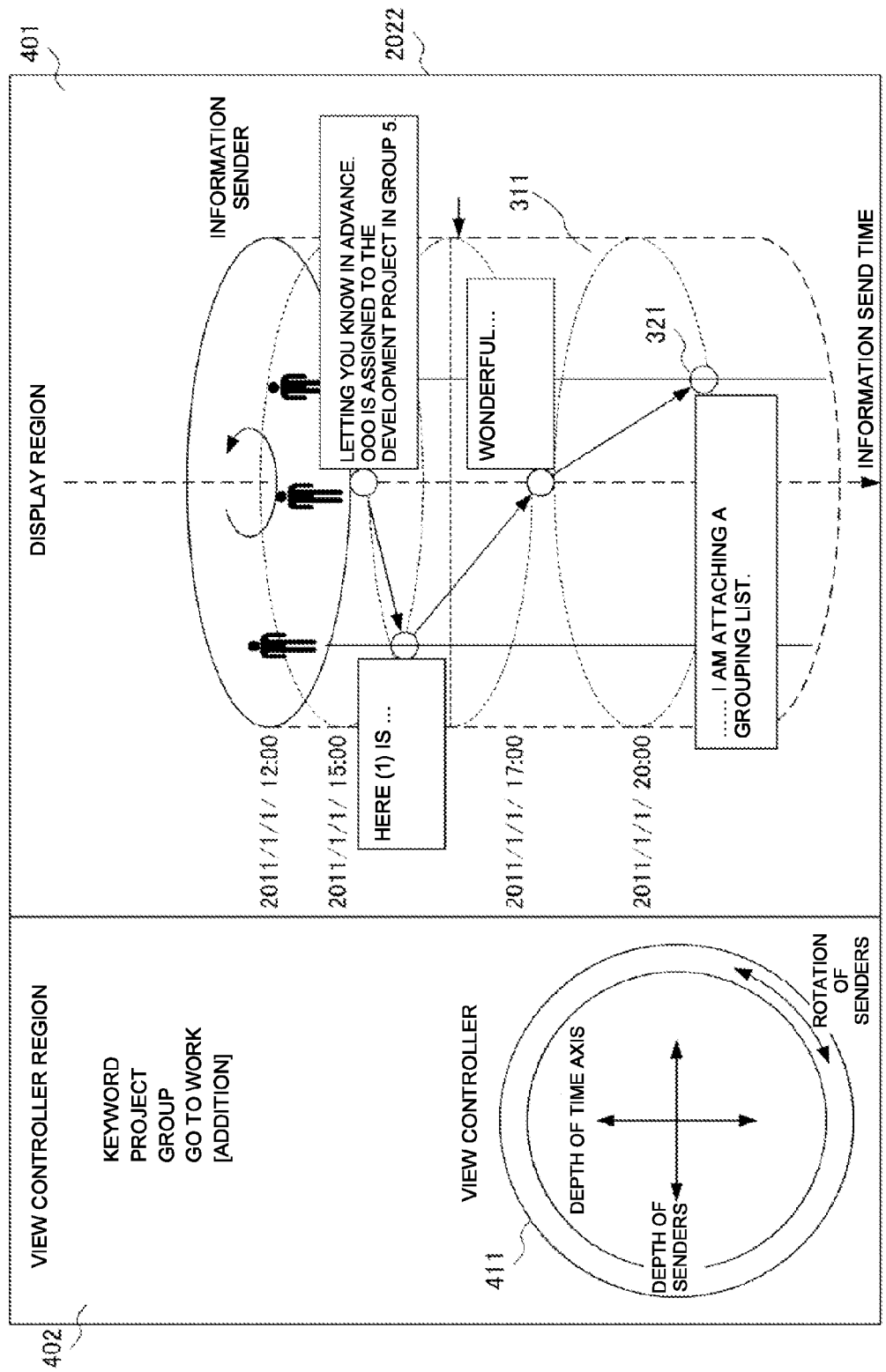
FIG. 8 is a diagram illustrating an example of a display of content information in cylindrical coordinates of a three-dimensional time series data processing device according to an embodiment of the present invention.

FIG. 8 is a diagram illustrating an example of display of content information in the cylindrical coordinates of the three-dimensional time series data processing device 10 according to an embodiment of the present invention. FIG. 8 shows that the display region of the display device 2022 is divided into a display region 401 and a view controller region 402.

The three-dimensional time series data processing device 10 displays a cylindrical diagram formed by cylindrical coordinates in the display region of FIG. 8, places marks 321 that correspond to emails on the surface of the cylinder, and displays the content of the emails that correspond to the placed positions. The three-dimensional time series data processing device 10 controls the display in the display region 401 according to an instruction specified in the view controller region 402. For example, when "project" and "group" are selected as keywords in the view controller region 402, the terms "project" and "group" included in the emails are highlighted by a color display in the display region 401. The keyword is, for example, a keyword extracted by the content analysis at step S105 of FIG. 6. Only the characteristic and important portions of the emails may be displayed in which a cascade display and an overlapping display are possible. In this manner, the three-dimensional time series data processing device 10 can highlight information having higher relevance on the front plane so that the flow of information can be followed and required information can be searched for easily.

Figure 9A:
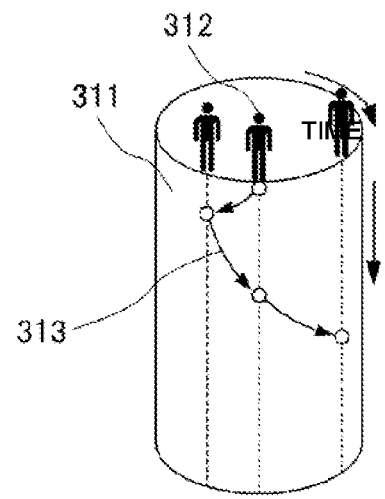
FIGS. 9a-9b present a diagram illustrating an example of a display of cylindrical coordinates of a three-dimensional time series data processing device according to an embodiment of the present invention.
Figure 9B:
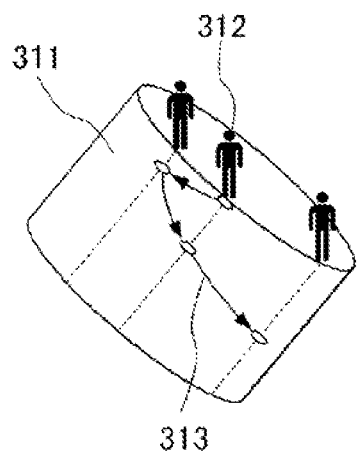

FIGS. 9a-9b present a diagram illustrating an example of a display of cylindrical coordinates of the three-dimensional time series data processing device 10 according to an embodiment of the present invention. FIG. 9a is a diagram illustrating that the three-dimensional time series data processing device 10, for example, rotates the z axis by a user operation to the view controller 411 according to a mouse drag to only display the relationship between emails. FIG. 9b is a diagram illustrating that the three-dimensional time series data processing device 10, for example, changes the slant of the cylinder formed by the cylindrical coordinates by a user operation to the view controller 411 according to a mouse drag. In this manner, the three-dimensional time series data processing device 10 can move the display of the emails placed on the surface of the cylinder according to the changes in the slant or rotation of the cylinder formed according to the cylindrical coordinates, and thus can display the emails so that the relationship between the emails can be easily ascertained.

Figure 10:
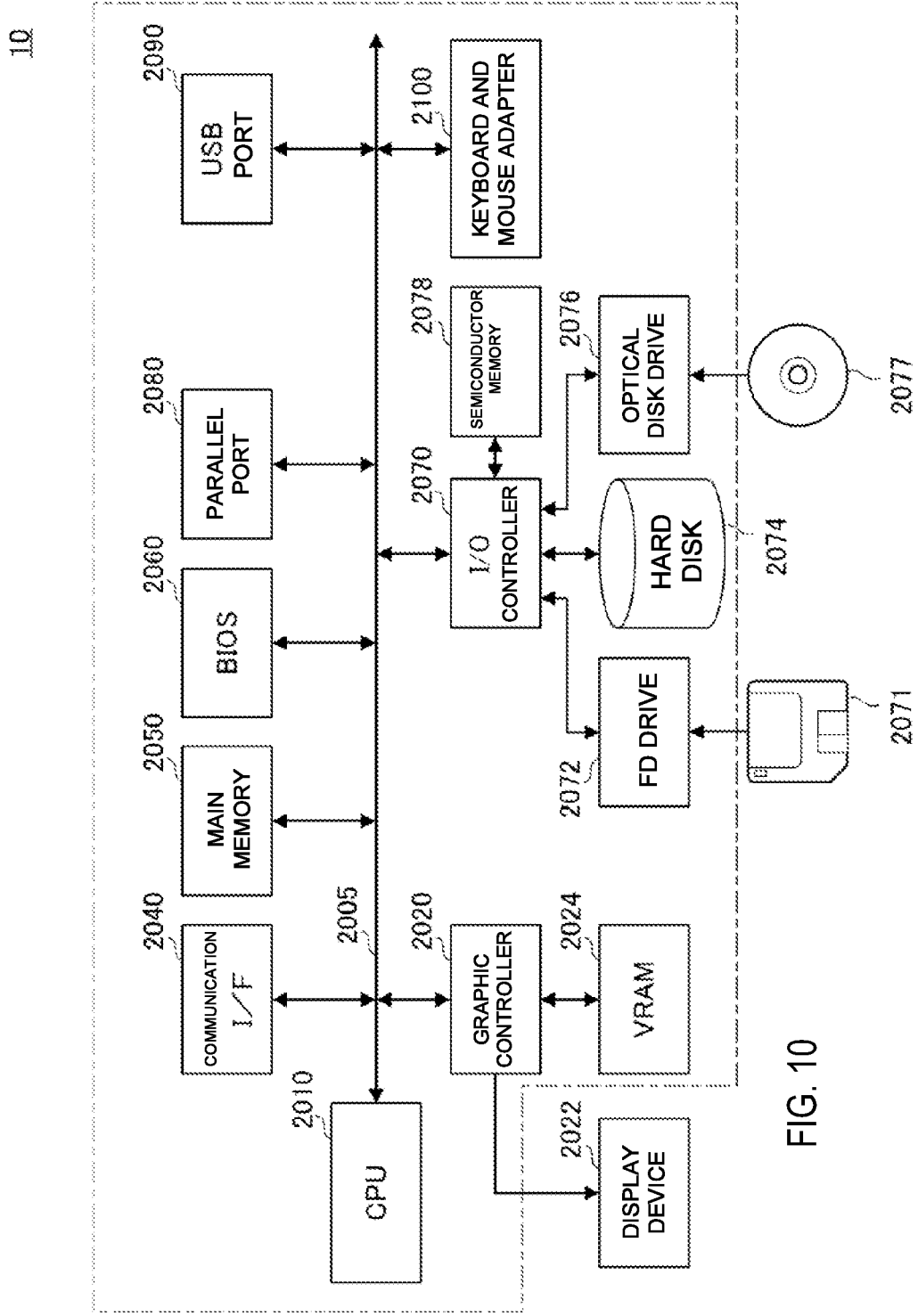
FIG. 10 is a diagram illustrating a hardware configuration of a three-dimensional time series data processing device according to an embodiment of the present invention.

FIG. 10 is a diagram illustrating a hardware configuration of the three-dimensional time series data processing device 10 according to an embodiment of the present invention. Although a general description of an information processing device is given below using a typical computer, it goes without saying that, in the case of a specialized device or an embedded device, a minimum required configuration can be selected according to such environment.

The three-dimensional time series data processing device 10 is provided with a central processing unit (CPU) 2010, a bus line 2005, communication I/F 2040, main memory 2050, basic input output system (BIOS) 2060, parallel port 2080, USB port 2090, graphic controller 2020, VRAM 2024, I/O controller 2070, and an input part with a keyboard and mouse adapter 2100. Various storage parts, such as a flexible disk (FD) drive 2072, hard disk 2074, optical disk drive 2076, semiconductor memory 2078, can be connected to the I/O controller 2070. A display device 2022 is connected to the graphic controller 2020. A relevance DB 31, rendering rule DB 32, and three-dimensional data DB 33 are configured in the hard disk 2074.

The BIOS 2060 stores a program executed by the CPU 2010 at the time of initializing the three-dimensional time series data processing device 10, a program that depends on hardware of the three-dimensional time series data processing device 10, and the like. The FD drive 2072 reads a program or data from the flexible disk 2071 and provides that to the main memory 2050 or the hard disk 2074 via the I/O controller 2070.

For example, a DVD-ROM drive, CD-ROM drive, DVD-RAM drive, or a CD-RAM drive may be used as the optical disk drive 2076. At this time, an optical disk 2077 that is supported by each drive must be used. The optical disk drive 2076 reads a program or data from the optical disk 2077 and may provide that to the main memory 2050 or the hard disk 2074 via the I/O controller 2070.

The computer program provided to the three-dimensional time series data processing device 10 is stored in a recording medium such as the flexible disk 2071, optical disk 2077, a memory card, or the like and is provided by a user. This computer program is read from the recording medium via the I/O controller 2070, or is downloaded via the communication I/F 2040, and thereby, installed into the three-dimensional time series data processing device 10 and run. The computer program causes the information processing device to operate in the manner described above.

The computer program above may be stored in an external storage medium. As an alternative to the flexible disk 2071, optical disk 2077, or memory card, a magneto-optical recording medium such as an MD or the like, or a tape medium may also be used as the storage medium. In addition, a storage device such as a hard disk, an optical disk library or the like provided on a server system connected to a leased communication line or the Internet may be used as a recording medium, and the computer program may be provided to the three-dimensional time series data processing device 10 via the communication line.

Figure 11A:
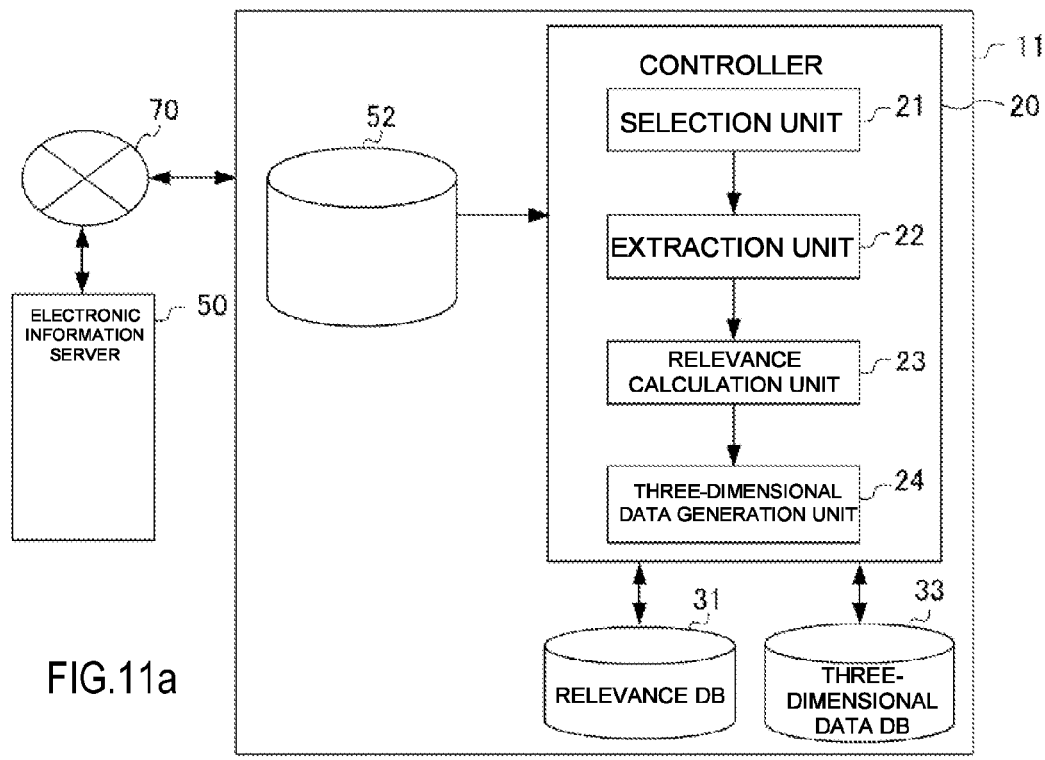
FIGS. 11a-11b present a diagram illustrating an example of a three-dimensional time series data processing device according to another embodiment of the present invention.
Figure 11B:
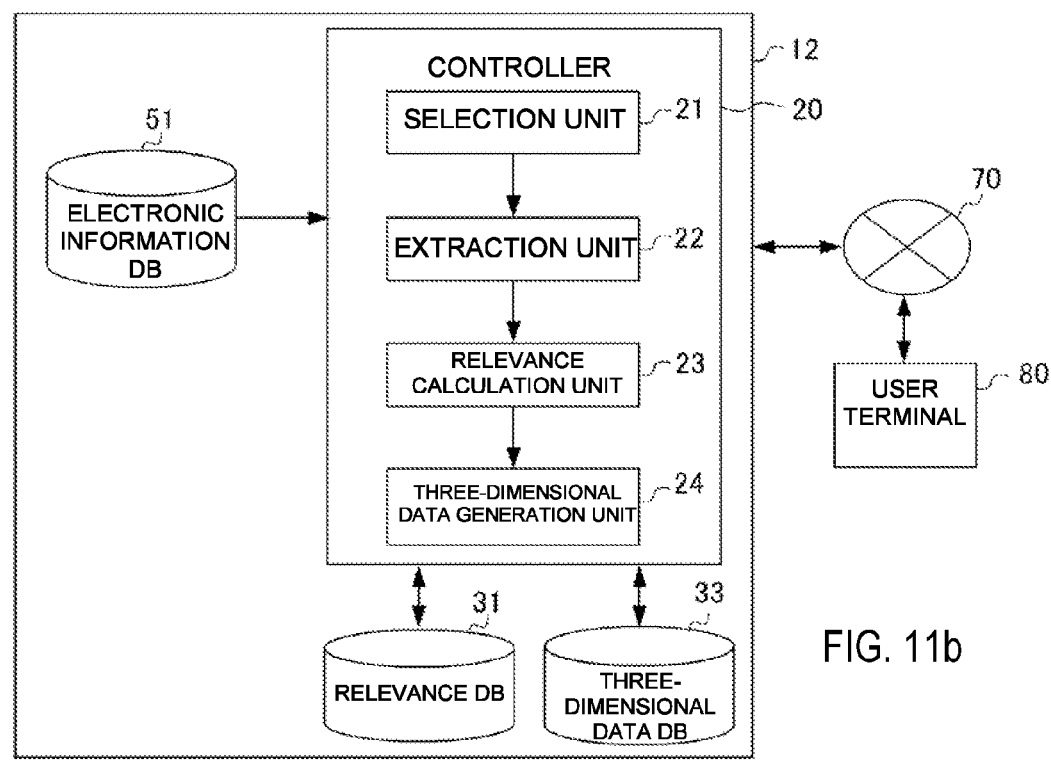

FIGS. 11a-11b present a diagram illustrating an example of a three-dimensional time series data processing device according to another embodiment of the present invention. FIG. 11a is an example of a three-dimensional time series data processing device 11 including a sender electronic information DB 52. The three-dimensional time series data processing device 11 is provided with the sender electronic information DB 52 into which the sender's electronic information sent and received is downloaded from the electronic information server 50, and can achieve a similar effect to that of the three-dimensional time series data processing device 10. FIG. 11b is an example of a three-dimensional time series data processing server 12 including the controller 20. The three-dimensional time series data processing server 12 sends three-dimensional time series data generated so as to be displayed by a user terminal 80 to the user terminal 80 via the Internet 70, and causes the user terminal to display the data so that a similar effect to that of the three-dimensional time series data processing device 10 can be achieved.

According to the above described embodiments, the three-dimensional time series data processing system 1 selects one electronic information, extracts electronic information that relates to the selected electronic information from the electronic information DB 51, calculates relevance between the sender of the selected electronic information and the sender of the extracted electronic information, and generates three-dimensional time series data for three-dimensionally rendering the relationship between the selected electronic information and the extracted electronic information in a virtual three-dimensional space where the sender, the send time and the relevance are axes, as positional information for each of the extracted electronic information. In addition, the three-dimensional time series data processing system 1 renders the three-dimensional time series data indicating the relevance of the electronic information in cylindrical coordinates and displays the data while modifying the viewing angle. Therefore, the three-dimensional time series data processing system 1 can display related electronic information from among sent and received electronic information in order to allow a user to easily ascertain the relationship thereof, and further increase visibility of related mails.

Thus, an object of the present invention is to provide a system, device, and method for generating display data that allows a user to easily ascertain relationship between related electronic information from among sent and received electronic information. A further object of the present invention is to provide a system, device, and method that can display related electronic information from among sent and received electronic information in order to allow the user to easily ascertain such relationship and that can increase the visibility of related mails.

The present invention, in consideration of the above problems, provides a solution as described below and/or herein.

(1) A three-dimensional time series data processing system including: an electronic information storage unit configured to store a plurality of electronic information that are sent and received via a given communication medium, each of the plurality of electronic information including content information and attribute information having identification information, sender information that indicates a sender, destination information that indicates a destination, send time information that indicates the time at which the corresponding electronic information is sent, and relation information that includes identification information of other related electronic information; a selection unit configured to select one electronic information from among the plurality of electronic information stored in the electronic information storage unit; an extraction unit configured to extract electronic information related to the selected electronic information selected by the selection unit, from among the plurality of electronic information stored in the electronic information storage unit; a relevance calculation unit configured to calculate the relevance between a selected sender indicated by the sender information of the selected electronic information and related senders indicated by the sender information of the plurality of electronic information extracted by the extraction unit; and a three-dimensional data generation unit configured to generate three-dimensional time-series data for three-dimensionally rendering a relationship between the selected electronic information and extracted electronic information extracted from the extraction unit, wherein the three-dimensional data generation unit generates positional information of each of the plurality of extracted electronic information in a virtual three-dimensional space in which a sender indicated by the sender information, a send time indicated by the send time information, and relevance calculated by the relevance calculation unit are axes.

According to the configuration of (1), the three-dimensional time series data processing system selects one electronic information, extracts electronic information that relates to the selected electronic data from the electronic information storage unit, calculates relevance between the sender of the selected electronic information and the sender of the extracted electronic information, and generates, as positional information of each of the extracted information in a virtual three-dimensional space in which the sender, the send time and the relevance are axes, three-dimensional time series data for three-dimensionally rendering the relationship between the selected electronic information and the extracted electronic information.

In other words, the three-dimensional time series data processing system according to the present invention generates three-dimensional time series data that can position a plurality of related electronic information within a virtual three-dimensional space. Therefore, the three-dimensional time series data processing system can create display data that allows a user to easily ascertain the relationship between related electronic information from among sent and received electronic information.

(2) The three-dimensional time series data processing system according to (1) further including a three-dimensional rendering unit configured to render three-dimensional time series data generated by the three-dimensional data generation unit, wherein the three-dimensional rendering unit includes a cylindrical coordinate unit in which the z axis of the cylindrical coordinates (r, θ, z) having a given radius r is the send time indicated by the send time information, and θ is the relevance, a cylindrical placement unit configured to place, along the surface of a cylinder formed by the cylindrical coordinate unit, content information of electronic information having the same sender information as the sender information of the selected electronic information from among the extracted electronic information in the center of the surface of the cylinder with θ as 0 degrees in order of the send time of the z axis, and places content information of electronic information having different sender information from the sender information of the selected electronic information from among the extracted electronic information on the surface of the cylinder by changing θ for each sender information according to the level of the relevance in order of the send time of the z axis, and a cylindrical display unit configured to display the content information placed by the cylindrical placement unit by changing the configuration of the display that shows the content information according to the position on the surface of the cylinder at which the content information is placed.

According to the configuration of (2), the three-dimensional time series data processing system described in (1) renders three-dimensional time series data for relevance of electronic information in cylindrical coordinates. Therefore, the three-dimensional time series data processing system can display related electronic information from among sent and received electronic information in order to allow the user to easily ascertain the relationship thereof and increase visibility of related mails.

(3) The three-dimensional time series data processing system according to (2), wherein the three-dimensional rendering unit further includes a rotation accepting unit configured to accept an instruction that designates the sender information from among the content information for each sender information placed by the cylindrical placement unit, and a rotational movement unit configured to make content information of electronic information having the same sender information as the sender information designated by the instruction accepted by the rotation accepting unit to be in the center of the surface of the cylinder, and to move content information of electronic information having different sender information from the designated sender information along the surface of the cylinder according to content information of the designated sender information placed in the center of the surface of the cylinder.

According to the configuration of (3), the three-dimensional time series data processing system described in (2) displays the relevance of electronic information rendered in cylindrical coordinates while changing the view angle. Therefore, the three-dimensional time series data processing system can display related electronic information from among sent and received electronic information in order to allow the user to easily ascertain the relationship thereof, and further increase visibility of related mails.

(4) The three-dimensional time series data processing system according to (2) or (3) further including a rendering rule storage unit configured to store rendering rules in which rules for three-dimensionally rendering three-dimensional time series data are prescribed, wherein the three-dimensional rendering unit renders based on the rendering rules stored in the rendering rule storage unit.

Therefore, the three-dimensional time series data processing system can display related electronic information from among sent and received electronic information in order to allow the user to easily ascertain the relationship thereof, and further increase visibility of related mails according to rendering rules.

(5) The three-dimensional time series data processing system according to any one of (1) to (4) wherein the electronic information is email, the related information is reply information recorded when replying to a received email, and the extraction unit includes, a related source extraction unit configured to extract electronic information identified by identification information included in related information of the selected electronic information, and further, extract electronic information identified by identification information included in related information of the extracted electronic information, and a related destination extraction unit configured to extract electronic information that includes identification information of the selected electronic information in related information, and further, extract electronic information that includes identification information of the extracted electronic information in related information.

Therefore, the three-dimensional time series data processing system can reliably extract and display electronic information having relevance from among sent and received electronic information so that such relevance can be easily ascertained.

(6) A three-dimensional time series data processing device communicatively connected to an electronic information server having an electronic information storage unit configured to store a plurality of electronic information that are sent and received via a given communication medium, each of the plurality of electronic information including content information and attribute information having identification information, sender information that indicates a sender, destination information that indicates a destination, send time information that indicates the time at which the corresponding electronic information is sent, and relation information that includes identification information of other related electronic information, in order to extract electronic information from the electronic information storage unit via the electronic information server and generate three-dimensional time series data, the three-dimensional time series data processing device including; a selection unit configured to select one electronic information from among the plurality of electronic information stored in the electronic information storage unit; an extraction unit configured to extract electronic information related to the selected electronic information selected by the selection unit, from among the plurality of electronic information stored in the electronic information storage unit; a relevance calculation unit configured to calculate the relevance between a selected sender indicated by the sender information of the selected electronic information and related senders indicated by the sender information of the plurality of electronic information extracted by the extraction unit; and a three-dimensional data generation unit configured to generate three-dimensional time-series data for three-dimensionally rendering a relationship between the selected electronic information and extracted electronic information extracted from the extraction unit, wherein the three-dimensional data generation unit generates positional information of each of the plurality of extracted electronic information in a virtual three-dimensional space in which a sender indicated by the sender information, a send time indicated by the send time information, and relevance calculated by the relevance calculation unit are axes.

Therefore, the three-dimensional time series data processing device can achieve the same effect as (1).

(7) A three-dimensional time series data processing device, including: an electronic information storage unit configured to store a plurality of electronic information that are sent and received via a given communication medium, each of the plurality of electronic information including content information and attribute information having identification information, sender information that indicates a sender, destination information that indicates a destination, send time information that indicates the time at which the corresponding electronic information is sent, and relation information that includes identification information of other related electronic information; a selection unit configured to select one electronic information from among the plurality of electronic information stored in the electronic information storage unit; an extraction unit configured to extract electronic information related to the selected electronic information selected by the selection unit, from among the plurality of electronic information stored in the electronic information storage unit; a relevance calculation unit configured to calculate the relevance between a selected sender indicated by the sender information of the selected electronic information and related senders indicated by the sender information of the plurality of electronic information extracted by the extraction unit; and a three-dimensional data generation unit configured to generate three-dimensional time-series data for three-dimensionally rendering a relationship between the selected electronic information and extracted electronic information extracted from the extraction unit, wherein the three-dimensional data generation unit generates positional information of each of the plurality of extracted electronic information in a virtual three-dimensional space in which a sender indicated by the sender information, a send time indicated by the send time information, and relevance calculated by the relevance calculation unit are axes.

Therefore, the three-dimensional time series data processing device including the electronic information storage unit can achieve the same effect as (1).

(8) A three-dimensional time series data processing server having an electronic information storage unit configured to store a plurality of electronic information that are sent and received via a given communication medium, each of the plurality of electronic information including content information and attribute information having identification information, sender information that indicates a sender, destination information that indicates a destination, send time information that indicates the time at which the corresponding electronic information is sent, and relation information that includes identification information of other related electronic information, and sending data to be displayed at a user terminal, the three-dimensional time serried data processing sever including; a selection unit configured to select one electronic information from among the plurality of electronic information stored in the electronic information storage unit; an extraction unit configured to extract electronic information related to the selected electronic information selected by the selection unit, from among the plurality of electronic information stored in the electronic information storage unit; a relevance calculation unit configured to calculate the relevance between a selected sender indicated by the sender information of the selected electronic information and related senders indicated by the sender information of the plurality of electronic information extracted by the extraction unit; and a three-dimensional data generation unit configured to generate three-dimensional time-series data for three-dimensionally rendering a relationship between the selected electronic information and extracted electronic information extracted from the extraction unit, wherein the three-dimensional data generation unit generates positional information of each of the plurality of extracted electronic information in a virtual three-dimensional space in which a sender indicated by the sender information, a send time indicated by the send time information, and relevance calculated by the relevance calculation unit are axes.

Therefore, the three-dimensional time series data processing server can achieve the same effect as (1) by sending the generated three-dimensional time series data to the user terminal and displaying.

(9) A three-dimensional time series data processing method executed by a system having an electronic information storage unit configured to store a plurality of electronic information that are sent and received via a given communication medium, each of the plurality of electronic information including content information and attribute information having identification information, sender information that indicates a sender, destination information that indicates a destination, send time information that indicates the time at which the corresponding electronic information is sent, and relation information that includes identification information of other related electronic information, the method including the steps of: selecting one electronic information from among the plurality of electronic information stored in the electronic information storage unit; extracting electronic information related to the selected electronic information selected by the selecting step, from the plurality of electronic information stored in the electronic information storage unit; calculating the relevance between a selected sender displayed by the sender information of the selected electronic information and related senders indicated by the sender information of the plurality of electronic information extracted by the extracting step; and generating three-dimensional time sequence data for three-dimensionally rendering a relationship between the selected electronic information and extracted electronic information extracted by the extracting step, wherein the three-dimensional data generating step generates positional information of each of the plurality of the extracted electronic information in a virtual three-dimensional space in which a sender indicated by the sender information, a send time indicated by the send time information, and relevance calculated by the relevance calculating step are axes.

Therefore, the three-dimensional time series data processing method can achieve the same effect as (1).

(10) A three-dimensional time series data processing program that causes a computer having an electronic information storage unit configured to store a plurality of electronic information that are sent and received via a given communication medium, each of the plurality of electronic information including content information and attribute information having identification information, sender information that indicates a sender, destination information that indicates a destination, send time information that indicates the time at which the corresponding electronic information is sent, and relation information that includes identification information of other related electronic information to execute the steps of: selecting one electronic information from among the plurality of electronic information stored in the electronic information storage unit; extracting electronic information related to the selected electronic information selected by the selecting step, from the plurality of electronic information stored in the electronic information storage unit; calculating the relevance between a selected sender displayed by the sender information of the selected electronic information and related senders indicated by the sender information of the plurality of electronic information extracted by the extracting step; and generating three-dimensional time sequence data for three-dimensionally rendering a relationship between the selected electronic information and extracted electronic information extracted by the extracting step, wherein the three-dimensional data generating step generates positional information of each of the plurality of the extracted electronic information in a virtual three-dimensional space in which a sender indicated by the sender information, a send time indicated by the send time information, and relevance calculated by the relevance calculating step are axes.

Therefore, the three-dimensional time series data processing program can achieve the same effect as (1) by causing a computer to execute the program.

According to the present invention, it is possible to generate display data that allows a user to easily ascertain relationship between related electronic information from among sent and received electronic information. Further, according to the present invention, related electronic information from among sent and received electronic information can be displayed and the visibility of related mails can be increased in order to allow the user to easily ascertain the relationship thereof.

Note that in one or more embodiments, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the preferred embodiments of the present invention have been described above, the present invention is not limited to the embodiments described above. In addition, the effects described in the embodiments of the present invention are only enumerations of optimally suited effects obtained by the present invention, and the effects according to the present invention are not limited to those described in the embodiments of the present invention.

The invention claimed is:

1. A three-dimensional time series data processing system, comprising:
    an electronic information hardware storage unit configured to store a plurality of electronic information that are sent and received via a given communication medium, each of the plurality of electronic information including content information and attribute information having identification information, sender information that indicates a sender, destination information that indicates a destination, send time information that indicates a time at which corresponding electronic information is sent, and relation information that includes identification information of other related electronic information;
    a selection hardware unit configured to select one electronic information from among the plurality of electronic information stored in the electronic information hardware storage unit;
    an extraction hardware unit configured to extract electronic information related to selected electronic information selected by the selection hardware unit, from among the plurality of electronic information stored in the electronic information storage hardware unit;
    a relevance calculation hardware unit configured to calculate a relevance between a selected sender indicated by the sender information of the selected electronic information and related senders indicated by the sender information from the plurality of electronic information extracted by the extraction hardware unit; and
    a three-dimensional data generation hardware unit configured to generate three-dimensional time-series data for three-dimensionally rendering a relationship between the selected electronic information and extracted electronic information extracted from the extraction hardware unit, wherein the three-dimensional data generation hardware unit generates positional information of each of the plurality of extracted electronic information in a virtual three-dimensional space in which a sender indicated by the sender information, a send time indicated by send time information, and relevance calculated by the relevance calculation hardware unit according to three-dimensional axes.

2. The three-dimensional time series data processing system according to claim 1, further comprising:
a three-dimensional rendering hardware unit configured to render three-dimensional time series data generated by the three-dimensional data generation hardware unit, wherein the three-dimensional rendering hardware unit comprises:
a cylindrical coordinate unit in which a z axis of cylindrical coordinates (r, θ, z) having a given radius r is the send time indicated by the send time information, and wherein θ is the relevance;
a cylindrical placement unit configured to place, along a surface of a cylinder formed by the cylindrical coordinate unit, content information of electronic information having same sender information as sender information of selected electronic information from among the extracted electronic information, wherein the content information is placed in a center of a surface of the cylinder with θ as 0 degrees in order of the send time of the z axis, and wherein the cylindrical placement unit places content information of electronic information having different sender information from the sender information of the selected electronic information from among the extracted electronic information on the surface of the cylinder by changing θ for each sender information according to a level of relevance in order of a send time of the z axis; and
a cylindrical display unit configured to display content information placed by the cylindrical placement unit by changing a configuration of the display that shows the content information according to a position on the surface of the cylinder at which the content information is placed.

3. The three-dimensional time series data processing system according to claim 2, wherein the three-dimensional rendering hardware unit further comprises:
a rotation accepting unit configured to accept an instruction that designates the sender information from among the content information for each sender information placed by the cylindrical placement unit, and
a rotational movement unit configured to make content information of electronic information having the same sender information as the sender information designated by the instruction accepted by the rotation accepting unit to be in the center of the surface of the cylinder, and to move content information of electronic information having different sender information from the designated sender information along the surface of the cylinder according to content information of the designated sender information placed in the center of the surface of the cylinder.

4. The three-dimensional time series data processing system according to claim 2, further comprising:
a rendering rule storage unit configured to store rendering rules in which rules for three-dimensionally rendering three-dimensional time series data are prescribed, wherein the three-dimensional rendering hardware unit renders based on the rendering rules stored in the rendering rule storage unit.

5. The three-dimensional time series data processing system according to claim 1, wherein the electronic information is email, wherein the related information is reply information recorded when replying to a received email, and wherein the extraction hardware unit comprises:
a related source extraction unit configured to extract electronic information identified by identification information included in related information of the selected electronic information, and further to extract electronic information identified by identification information included in related information of the extracted electronic information, and
a related destination extraction unit configured to extract electronic information that includes identification information of the selected electronic information in related information, and further to extract electronic information that includes identification information of the extracted electronic information in related information.

6. A method of generating three-dimensional time series data, the method comprising:
storing, by one or more processors, a plurality of electronic information that are sent and received via a given communication medium, each of the plurality of electronic information including content information and attribute information having identification information, sender information that indicates a sender, destination information that indicates a destination, send time information that indicates a time at which corresponding electronic information is sent, and relation information that includes identification information of other related electronic information;
selecting, by one or more processors, one electronic information from among the plurality of electronic information stored by the one or more processors;
extracting, by one or more processors, electronic information related to selected electronic information selected, from among the plurality of electronic information stored by the one or more processors;
calculating, by one or more processors, a relevance between a selected sender indicated by the sender information of the selected electronic information and related senders indicated by the sender information from the plurality of electronic information extracted by the one or more processors; and
generating, by one or more processors, three-dimensional time-series data for three-dimensionally rendering a relationship between the selected electronic information and extracted electronic information extracted by the one or more processors, wherein said one or more processors generates positional information of each of the plurality of extracted electronic information in a virtual three-dimensional space in which a sender indicated by the sender information, a send time indicated by send time information, and relevance calculated by the one or more processors according to three-dimensional axes.

7. The method of claim 6, further comprising:
rendering, by one or more processors, three-dimensional time series data generated by the three-dimensional data generation unit, wherein a rendered three-dimensional time series data comprises a z axis, of the cylindrical coordinates (r, θ, z) having a given radius r, wherein z is the send time indicated by the send time information, and wherein θ is the relevance;
placing, by one or more processors and along a surface of a cylinder formed by the cylindrical coordinate unit, content information of electronic information having same sender information as sender information of selected electronic information from among the extracted electronic information, wherein the content information is placed in a center of a surface of the cylinder with θ as 0 degrees in order of the send time of the z axis, and wherein the cylindrical placement unit places content information of electronic information having different sender information from the sender information of the selected electronic information from among the extracted electronic information on the surface of the cylinder by changing θ for each sender information according to a level of relevance in order of a send time of the z axis; and displaying, by one or more processors, content information placed by the cylindrical placement unit by changing a configuration of the display that shows the content information according to a position on the surface of the cylinder at which the content information is placed.

8. The method of claim 7, further comprising:

accepting, by one or more processors, an instruction that designates sender information from among the content information for each sender information placed by the cylindrical placement unit, and making, by one or more processors, content information of electronic information having a same sender information as the sender information designated by the instruction accepted by the rotation accepting unit to be in the center of the surface of the cylinder; and moving, by one or more processors, content information of electronic information having different sender information from the designated sender information along the surface of the cylinder according to content information of the designated sender information placed in the center of the surface of the cylinder.

9. The method of claim 7, further comprising:

storing, by one or more processors, rendering rules in which rules for three-dimensionally rendering three-dimensional time series data are prescribed, wherein the three-dimensional rendering unit renders based on the rendering rules stored in a rendering rule storage unit.

10. The method of claim 6, wherein the electronic information is email, wherein the related information is reply information recorded when replying to a received email, and wherein the method further comprises:

extracting, by one or more processors, electronic information identified by identification information included in related information of the selected electronic information;

extracting, by one or more processors, electronic information identified by identification information included in related information of the extracted electronic information;

extracting, by one or more processors, electronic information that includes identification information of the selected electronic information in related information; and extracting, by one or more processors, electronic information that includes identification information of the extracted electronic information in related information.

11. A computer program product for generating three-dimensional time series data, the computer program product comprising a computer readable storage medium having program code embodied therewith, the program code readable and executable by a processor to perform a method comprising:

storing a plurality of electronic information that are sent and received via a given communication medium, each of the plurality of electronic information including content information and attribute information having identification information, sender information that indicates a sender, destination information that indicates a destination, send time information that indicates a time at which corresponding electronic information is sent, and relation information that includes identification information of other related electronic information;

selecting one electronic information from among the plurality of electronic information stored in the electronic information storage unit;

extracting electronic information related to selected electronic information selected by the selection unit, from among the plurality of electronic information stored in the electronic information storage unit;

calculating a relevance between a selected sender indicated by the sender information of the selected electronic information and related senders indicated by the sender information from the plurality of electronic information extracted by the extraction unit; and generating three-dimensional time-series data for three-dimensionally rendering a relationship between the selected electronic information and extracted electronic information extracted from the extraction unit, wherein the three-dimensional data generation unit generates positional information of each of the plurality of extracted electronic information in a virtual three-dimensional space in which a sender indicated by the sender information, a send time indicated by send time information, and relevance calculated by the relevance calculation unit according to three-dimensional axes.

12. The computer program product of claim 11, wherein the method further comprises:

rendering three-dimensional time series data generated by the three-dimensional data generation unit, wherein a rendered three-dimensional time series data comprises a z axis, of the cylindrical coordinates (r, θ, z) having a given radius r, wherein z is the send time indicated by the send time information, and wherein θ is the relevance;

placing, along a surface of a cylinder formed by the cylindrical coordinate unit, content information of electronic information having same sender information as sender information of selected electronic information from among the extracted electronic information, wherein the content information is placed in a center of a surface of the cylinder with θ as 0 degrees in order of the send time of the z axis, and wherein the cylindrical placement unit places content information of electronic information having different sender information from the sender information of the selected electronic information from among the extracted electronic information on the surface of the cylinder by changing θ for each sender information according to a level of relevance in order of a send time of the z axis; and displaying content information placed by the cylindrical placement unit by changing a configuration of the display that shows the content information according to a position on the surface of the cylinder at which the content information is placed.

13. The computer program product of claim 12, wherein the method further comprises: accepting an instruction that designates the sender information from among the content information for each sender information placed by the cylindrical placement unit, and making content information of electronic information having the same sender information as the sender information designated by the instruction accepted by the rotation accepting unit to be in the center of the surface of the cylinder, and to move content information of electronic information having different sender information from the designated sender information along the surface of the cylinder according to content information of the designated sender information placed in the center of the surface of the cylinder.

14. The computer program product of claim 11, wherein the method further comprises:
   storing rendering rules in which rules for three-dimensionally rendering three-dimensional time series data are prescribed, wherein the three-dimensional rendering unit renders based on the rendering rules stored in a rendering rule storage unit.

15. The computer program product of claim 11, wherein the electronic information is email, wherein the related information is reply information recorded when replying to a received email, and wherein the method further comprises:
   extracting electronic information identified by identification information included in related information of the selected electronic information;
   extracting electronic information identified by identification information included in related information of the extracted electronic information;
   extracting electronic information that includes identification information of the selected electronic information in related information; and
   extracting electronic information that includes identification information of the extracted electronic information in related information.

* * * * *